(12) United States Patent
Kozlenok

(10) Patent No.: US 11,529,863 B2
(45) Date of Patent: Dec. 20, 2022

(54) TWO WHEEL AUTOMATIC GUIDED VEHICLES USED IN COMBINATION

(71) Applicant: Arrival Limited, London (GB)

(72) Inventor: Alexander Kozlenok, London (GB)

(73) Assignee: Arrival Limited, London (GB)

( * ) Notice: Subject to any disclaimer, the term of this patent is extended or adjusted under 35 U.S.C. 154(b) by 475 days.

(21) Appl. No.: 16/696,579

(22) Filed: Nov. 26, 2019

(65) Prior Publication Data

US 2020/0164737 A1 May 28, 2020

(30) Foreign Application Priority Data

Nov. 28, 2018 (GB) ...................................... 1819352

(51) Int. Cl.
*B60K 7/00* (2006.01)
*B62D 63/02* (2006.01)
*B60D 1/48* (2006.01)

(52) U.S. Cl.
CPC ............ B60K 7/0007 (2013.01); B60D 1/488 (2013.01); B62D 63/025 (2013.01); *B60K 2007/0092* (2013.01)

(58) Field of Classification Search
CPC .......... B60K 7/0007; B60K 2007/0092; B60K 1/02; B60D 1/488; B62D 63/025; B62D 63/02; B62D 53/005; B62D 61/10; G05D 2201/0216; G05D 1/0293; B25J 5/007; B25J 9/009; B25J 9/106; B25J 11/008
See application file for complete search history.

(56) References Cited

U.S. PATENT DOCUMENTS

| 5,559,696 A * | 9/1996 | Borenstein ............. G01C 21/12 701/23 |
| 2009/0012666 A1* | 1/2009 | Simpson ............... G05D 1/0293 701/23 |

(Continued)

FOREIGN PATENT DOCUMENTS

| WO | WO2012044663 | 4/2012 |
| WO | WO2012116729 | 9/2012 |
| WO | WO2018211481 | 11/2018 |

OTHER PUBLICATIONS

GB Combined Search and Examination Report from corresponding GB patent application No. GB1819352.4 dated May 13, 2019, 5 pages.

(Continued)

*Primary Examiner* — Mary Cheung
(74) *Attorney, Agent, or Firm* — Lee & Hayes, P.C.

(57) ABSTRACT

An automatic guided vehicles (AGV) can include: motors, wheels, motor controllers, and batteries coupled to an elongated frame. The two wheels can be mounted on opposite sides of the elongated frame. The wheels can be coupled to motors which can be controlled by motor controllers. The motors and motor controllers can be attached to the frame and a connector flange can be mounted on a center portion of the AGV frame. Linkages are used to couple a plurality of AGVs together. In a two AGV embodiment, the AGVs can be mounted to a front portion and a rear portion on a centerline of a platform. In a four AGV embodiment, front width, rear width, left length, and right length linkages can form a parallelogram with AGVs couple to each of the four corners of the parallelogram.

9 Claims, 9 Drawing Sheets

(56) References Cited

U.S. PATENT DOCUMENTS

2015/0125252 A1* 5/2015 Berzen Ratzel ..... G05D 1/0293
                                                    414/800
2016/0306360 A1* 10/2016 Seaton ................... B61L 3/127
2018/0259962 A1   9/2018 Junkins et al.

OTHER PUBLICATIONS

EP Search Report for corresponding EP Patent Application No. 19211971.7 dated Feb. 11, 2020, 8 pages.
GB Examination Report from corresponding GB patent application No. GB1819352.4 dated Jan. 28, 20, 2 pages.

* cited by examiner

TWO WHEEL AUTOMATIC GUIDED VEHICLES USED IN COMBINATION

This Application claims priority Great Britain Application No. 1819352.4, filed Nov. 28, 2018, which is incorporated herein by reference.

FIELD OF INVENTION

The field of invention is the physical operations of the technological process, product design and assembling optimizations in robotized manufacturing.

BACKGROUND

In robotized manufacturing, systems must be configured with consideration of the physical operations of the technological process, product design and assembling optimizations. Robotized manufacturing can include automatic guided vehicles (AGV) which are portable robots that can follow markers or wires in the floor, or uses vision, magnets, or lasers for navigation. AGVs are most often used in industrial applications to move materials around a manufacturing facility or warehouse. AGV systems can include multiple battery powered AGV vehicles that navigate along pre-defined guided paths. AGV vehicles can navigate in the facility using several guidance technologies including floor-surface mounted magnetic tape or bars, lasers, optical sensors, and magnet/gyroscope based inertial guidance. These guidance technologies make it easy to change the routes of the AGV vehicles and expands the AGV system in response to facility changes for a flexible and scalable material handling solution. Robotized manufacturing requires a high degree of automation and flexible manufacturing systems, there are a number of requirements to automated logistics and delivery methods within the workshop: low-cost, high reliability, flexibility of the AGV system. While individual AGVs can be used to transport payloads, in other embodiments larger payloads may need multiple AGVs for transportation. What is needed are improved AGVs which can function in cooperation with each other for transporting containers and objects.

SUMMARY OF THE INVENTION

According to the present invention there is provided a robotic transportation apparatus as claimed in claim 1. Each AGV preferably includes a left wheel coupled to a left motor and a right wheel coupled to a right motor. The rotational axis of the left wheel may be aligned with the rotational axis of the right wheel. The motors may be brushless DC motors which may be coupled to the wheels through planetary gears. A motor control unit may have wireless radio frequency communications and the motor control unit may control the left and right motors. The left motor, the right motor and rechargeable batteries may be mounted on a frame. A payload holder column may be mounted on a center portion of the frame and a connector joint may be mounted on a top portion of the payload holder column. The frame and batteries may be below the rotational axis of the wheels, so the weight of these components results in AGV remaining upright. More specifically, the center of gravity of the AGV may be below the rotational axis so the AGV will normally rotate to an upright position.

in addition to or using an alternative mechanism to balance the AGV, tilt sensors and/or gyroscopic sensors may be provided to detect the angle and rotational movement of the AGV. The tilt and gyroscopic sensors may communicate with a processor which may control motors that rotate the wheels which may be driven forward or backward as needed to return the pitch of the AGV to an upright position. In some embodiments, the AGV may use brushless DC electric motors coupled to each wheel which may be powered by lithium-ion or other rechargeable batteries.

The AGV may detect the vertical or upright angle of the AGV. If the vertical angle of the AGV is not within a predetermined range of angles, the motor controller may adjust the movement of the wheels to correct the vertical angle of the AGV and prevent AGV body from flipping over. For example, in one embodiment, the controller can require the AGV to be within 10 degrees of 90 degrees upright. The accelerometers may be configured in a vertical and horizontal orientation and the outputs of the vertical and horizontal accelerometers can be used to determine the vertical angle of the AGV. If the AGV is leaning back too far while the AGV is moving, the motor controller can slow the motors and wheels so that the deceleration force will cause the AGV to rotate about the axis of the wheels to a more upright position back to be within the predetermined vertical angle range.

The AGVs may be independently controlled by an AGV controller to move the robotic transportation apparatus. The AGV controller may coordinate the movements of the AGVs that are coupled together. In a two AGV arrangement, the two AGVs may be coupled to a platform on a center line of the platform. The AGVs may have connection flanges which extend from an upper surface of the AGVs. The platform may have a width that is the same width as the AGVs. A front AGV may be coupled to a front portion of the platform and a rear AGV may be coupled a rear portion of the platform. The AGV controller may independently control each motor and wheel of the robotic transportation apparatus. In order to turn each AGV, one wheel may be rotated faster than the opposite wheel. For example, when the left wheel is rotated faster than the right wheel, the AGV will turn right. The AGV can rotate freely under the platform. The rear AGV may be controlled to allow it to remain aligned with the platform and follow the front AGV.

In other embodiments, the robotic transportation apparatus may include four AGVs which may be coupled together with linkages including a left length linkage, a right length linkage, a front width linkage and a rear width linkage. In one embodiment, the linkages may be coupled together by vertically oriented cylindrical posts. The linkages may include two or more vertical holes which may be parallel to each other. The holes may be at the ends of the linkages. In the assembled configuration, the linkages may form a parallelogram with an AGV at each corner of the parallelogram. The posts may extend vertically and pass through the holes at the ends of the linkages and allow the linkages to rotated relative to each other. The posts at each corner of the parallelogram may extend downward and be placed in a vertical hole in each of the AGVs.

The AGV controller may control each wheel of each AGV to control the configuration of the robotic transportation apparatus. In a transportation configuration, the linkages may form a rectangle upon which a rectangular structure may be placed. The AGV controller may control the AGVs to maintain the rectangular shape of the linkages as the robotic transportation apparatus travels a controlled path. In some embodiments, it may be desirable to change the shape of the linkages to a narrower parallelogram. The AGV controller may cause the movements of the AGVs to change the shape of the four linkages to a narrower or wider parallelogram.

In one embodiment the holes in the tops of the AGVs may be coupled to a hitch mechanism integrated into the AGV. The hole in the AGV may be a connector joint within a head tube that has an inner cylindrical surface. The head tube may surround an upper rotational member and a lower rotational member. A holder cup may be placed within the upper rotational member and the lower rotational member and the holder cup may rotate within the head tube. In different embodiments, the upper rotational member and the lower rotational member may be bushings, bearings (roller or ball), or any structures to allow the holder cup to rotate in a lower friction manner within the head tube. In one embodiment the upper rotational member may be a radial bearing and the lower rotational member may be a thrust bearing which may provide radial support as well as axial support which may resist the downward force of the connector.

DETAILED DESCRIPTION

Figure 1:
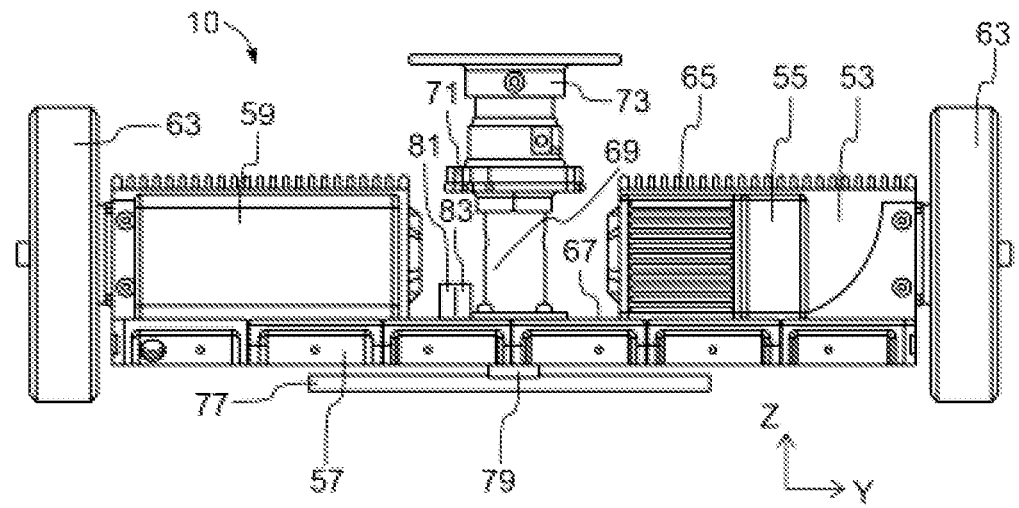
FIG. 1 illustrates a front view of an embodiment of an AGV.
Figure 2:
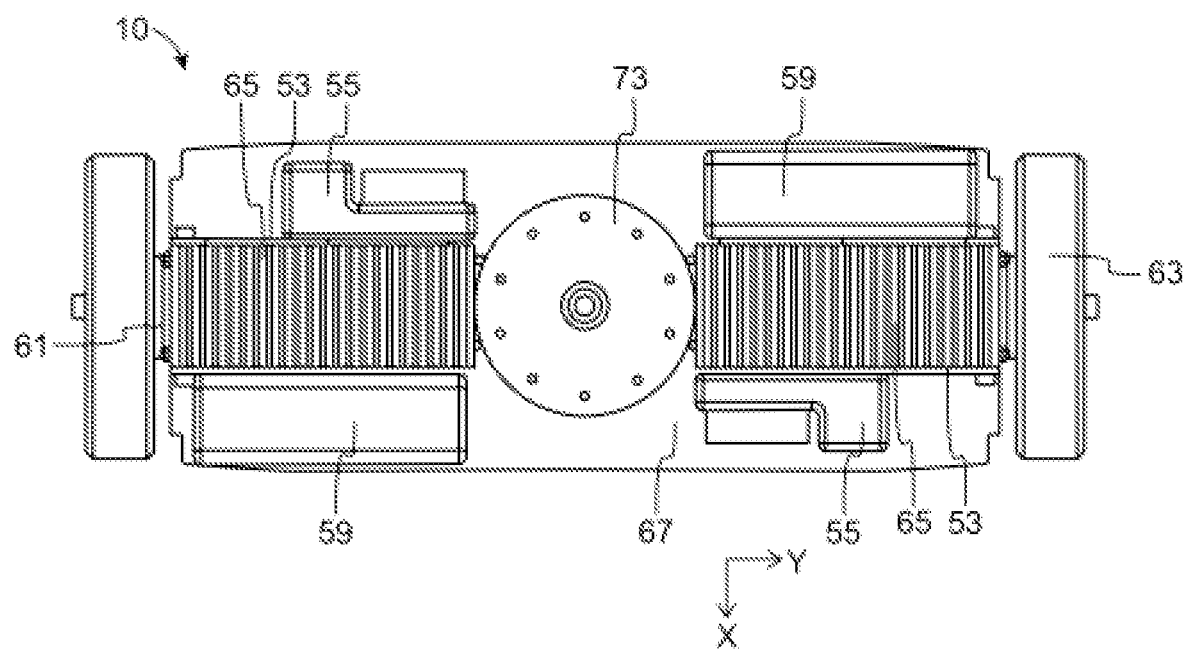
FIG. 2 illustrates a top view of an embodiment of an AGV.
Figure 3:
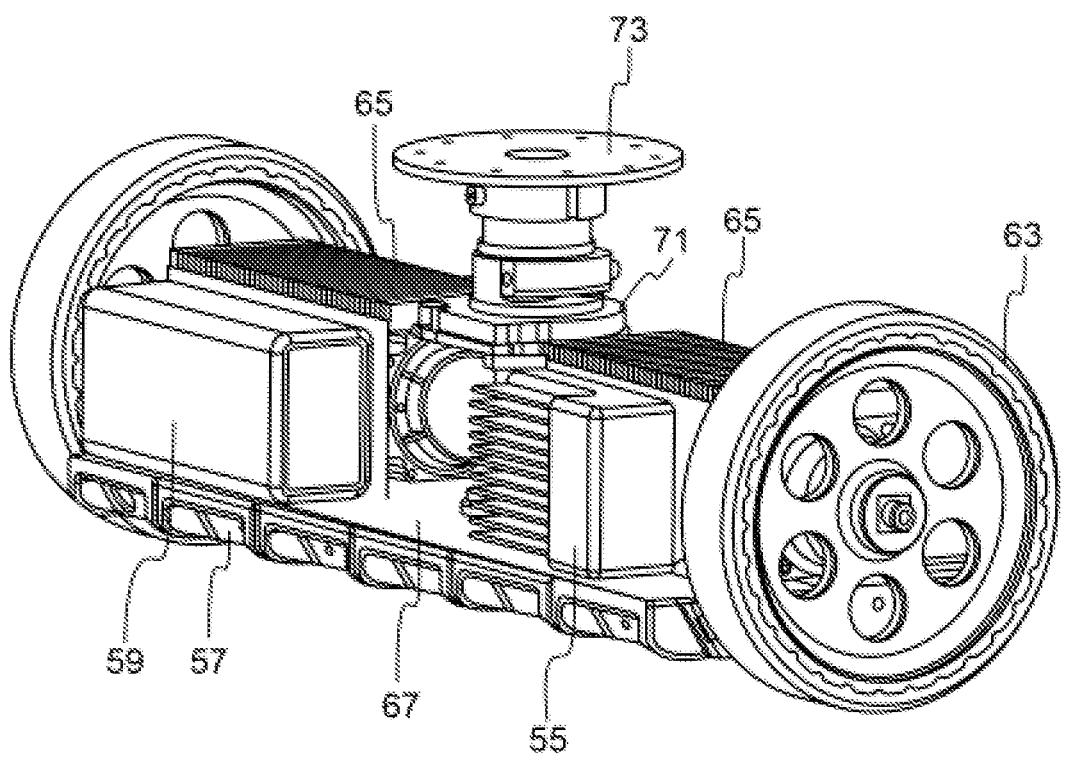
FIG. 3 illustrates a perspective view of an embodiment of an AGV.

FIG. 1 illustrates a front view, FIG. 2 illustrates a top view and FIG. 3 illustrates a perspective view of an embodiment of an automatic guided vehicle (AGV) 10 which can have two wheels 63 which are each driven by an electric motor 53. In an embodiment, the electric motors 53 can be brushless direct current (BLDC) motors. The motors 53 are powered by rechargeable batteries 57 and controlled by a motor controller 55. The motor controllers 55 can include a main controller circuit and electrical power switching mechanisms. For example, the motor controllers 55 can include a general purpose central processing unit (CPU) such as an Arduino® controller and general purpose input/output (GPIO) mounted drivers. The CPU might also play a role of the controlling unit for additional devices such as robot equipment, active grippers, holders, cameras, sensors, etc. mounted on the AGV 10.

The CPU might serve as a computational resource for AGV localization and navigation algorithms. The AGV 10 can also include communication means with wireless networks. For example, the communications mechanism can be a radio frequency (RF) device such as a Wi-Fi mechanism or any other RF communications transceiver system. In an embodiment a system controller can transmit navigational controls to a plurality of AGVs and each of the AGVs 10 can transmit location information back to the system controller for feedback for the locations of the plurality of AGVs.

The AGV 10 may also include batteries 57 and a battery monitoring system. Because the batteries 57 can have a high weight, they can be mounted under the frame 67 below the center of rotation or the rotational axis of the wheels 63. The weight of the batteries 57 can help to passively keep the AGV 10 in the upright position. The batteries 57 can be charged and the AGV 10 can be operated. Depending on use-case, the batteries 57 might be replaced when the batteries 57 are fully discharged or depleted. Alternatively, the batteries 57 might be charged by moving the AGV 10 to a charging station so that the batteries 57 can be charged.

In the illustrated embodiment, the motors 53 and the motor controllers 55 can be mounted on an upper planar surface of a rectangular frame 67 which can be lower than the rotational axis of the wheels 63. In an embodiment, a protective material can be placed around the perimeter of the frame 67. The protective material can prevent damage to the AGV 10 in the event of a collision.

A payload holder column 69 can be mounted to a center of the upper surface of a rectangular frame 67. A lower portion of a rotation resolver 71 can be attached to the upper end or portion of the payload holder column 69 and a connection flange 73 can be coupled to an upper portion of the rotation resolver 71 which can be a rotational coupling. Thus, the connection flange 73 can rotate freely about the vertical Z axis relative to the payload holder column 69 and the frame 67. The connection flange 73 can be coupled to other objects and used as a towing connection for the AGV 10.

The motors 53 can be coupled to cooling plates 65 which can be heat sinks which can dissipate heat and keep the motors 53 and other AGV 10 components within the optimum working temperature. The cooling plate 65 can include a plurality of fins which provide a larger exposed area for convection heat transfer from the solid metal surfaces to the ambient air. The cooling plates 65 function as passive heat exchangers. In other embodiments, cooling of the AGV 10 components can be improved with an active cooling system which can include fans which can circulate cooler air over the fins of the cooling plates 65.

The electric motors 53 can be connected to the wheels directly or be coupled to a planetary gear assembly which is coupled to the wheels 63. In an embodiment, the planetary gear assembly can consist of sun and planet gears mounted so that the center of the planet gear revolves around the center of the sun gear. The planet and sun gears mesh so that their pitch circles roll without slip. A planetary gear train can be assembled so the planet gear rolls on the inside of the pitch circle of a fixed, outer gear ring, or ring gear, sometimes called an annular gear. In this case, the curve traced by a point on the pitch circle of the planet is a hypocycloid. The planetary gearing can reduce the rotational velocity of the electric motors 53 transmitted to the wheels 63. In an embodiment, the AGV 10 can have a brake system which can have various different implementations. For example, in an embodiment the AGV 10 can have an integrated vision or object detection mechanism. When an imminent collision is detected, the AGV 10 can actuate a brake mechanism to stop the movement of the AGV 10 immediately.

When proposed dual-wheeled AGV robot platform is used as a single unit, the vertical position must be guaranteed. Two types of stabilization are used: passive and active. Passive stabilization is ensured by the device composition, when the center of mass of the robot is below the axis of the wheels, which allows to move with relatively small acceleration (value depends on the particular implementation) with a load, which does not cause significant shift of the center of mass (value depends on implementation, should be not more than the weight of the mass below axis) without causing the robot to overturn. To assure passive stabilization, the moment of inertia of the robot must be higher than the moment on the driving wheels, which allows the robot to be a pendulum, and its resting state is determined by the position of the center of mass.

Active stabilization is necessary when a payload shifts the center of mass of the system above the axis of the driving wheels, thereby creating a system of a reverse pendulum. The system is balanced by impulse control of the driving wheel motors, and the data on the position of the robot in space is determined by means of an inertial measurement unit (IMU). In some implementations the gyroscopic module might be used for this purpose. In cheaper implementations, the torque is controlled by balancing the driving wheels acceleration.

In an embodiment, the AGV 10 can have a stabilization system which can be part of the motor controller 55. The stabilization system can include accelerometers which are used to detect the orientation of the AGV 10. For example, the accelerometers can be mounted in an X and Z orientations to detect the vertical or upright angle of the AGV 10. If the vertical angle of the AGV 10 is not within a predetermined range of angles, the motor controllers 55 can adjust the movement of the wheels 63 to correct the vertical upright angle of the AGV 10 and prevent the AGV body from flipping over. For example, the controller can require the AGV to be within 10 or less degrees of 90 degrees upright. If the AGV 10 is rotated too far back or forward about the y-Axis while the AGV is moving, the motor controllers 55 can adjust the rotational speeds of the motors 53 and wheels 63 so that the AGV 10 will return to an upright position with the frame 67 in a horizontal position within the predetermined angle range.

The proposed AGV robot might be gyrostabilized. In an embodiment with reference to FIG. 1, the AGV 10 can be gyrostabilized and have a gyroscope which can be a rotating disk 77 coupled to a gyroscope motor 79. The gyroscope can consist of any mass, typically a disc 77 or wheel coupled to a motor 79. The gyroscope can be mounted around a lower portion of the frame 67. The rotating disc 77 can maintain its orientation and can automatically counteract unwanted rotary movements of the frame 67 and AGV 10 about the vertical Z axis. In other embodiments, the gyroscope can be mounted within or under the frame 67.

In addition to or using an alternative mechanism to balance the AGV 10, tilt sensors 81 and/or gyroscopic sensors 83 may be provided to detect the angle and rotational movement of the AGV 10. The tilt sensors 81 and gyroscopic sensors 83 can communicate with a processor controller 55 which can control motors 53 that rotate the wheels 63 which are driven forward or backward as needed to return the pitch of the AGV 10 to an upright position. In some embodiments, the AGV 10 can use brushless DC electric motors coupled to each wheel which are powered by lithium-ion or other rechargeable batteries. The AGV 10 can detect the vertical or upright angle of the AGV 10. If the vertical angle of the AGV 10 is not within a predetermined range of angles, the motor controller 55 can adjust the movement of the wheels to correct the vertical angle of the AGV 10 and prevent AGV body or frame 67 from flipping over. For example, in an embodiment, the controller 55 can require the AGV 10 to be within 10 degrees of 90 degrees upright. The accelerometer sensors 81 can be configured in a vertical and horizontal orientation and the outputs of the vertical and horizontal accelerometer sensors 81 can be used to determine the vertical angle of the AGV 10. If the AGV 10 is leaning back too far while the AGV 10 is moving, the motor controller 55 can slow the motors 53 and wheels 63 so that the deceleration force will cause the AGV 10 to rotate about the axis of the wheels 63 to a more upright position back to be within the predetermined vertical angle range.

Figure 4:
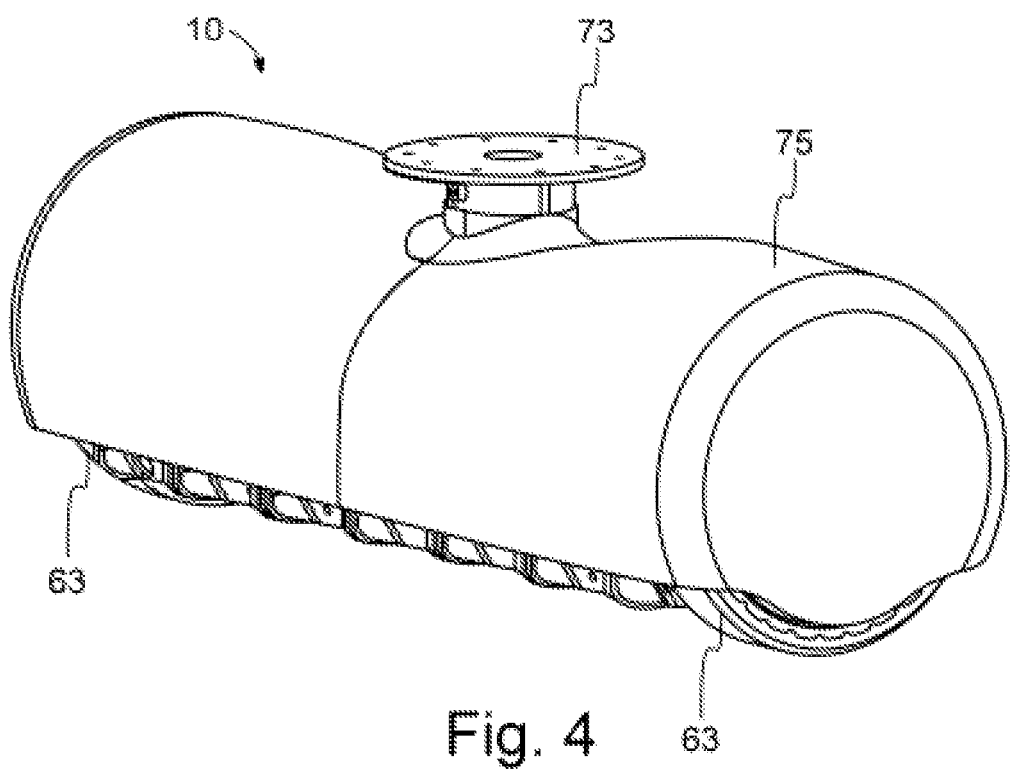
FIG. 4 illustrates a perspective view of an embodiment of an AGV with a covering.

With reference to FIG. 4, in an embodiment, it can be important to protect the moving components from ambient conditions such as dust, dirt, water, snow, etc. It can also be important to shield the AGV components from people and objects in the proximity of the AGV. In some embodiments, the AGV can have a rigid covering 75. In the illustrated embodiment, the covering 75 can be a smooth cylindrical structure which can completely cover the upper surfaces of the AGV 10 and the side surfaces of the wheels 63. The connection flange 73 extends out of hole in the upper center surface of the covering 75. The connection flange 73 can rotate about a vertical axis. The lower portion of the rigid covering 75 can be open with the lower portions of the wheels 63 extending below the lower edge of the rigid covering 75 so that it does not interfere with the rolling movements of the wheels 63. The rigid covering 75 can protect the internal components of the AGV 10 when there is a collision or contact with the AGV 10 which can protect the AGV from damage. Further, the smoother outer surface of the covering 75 can prevent any sharp objects from contacting people or obstacles in the path of the AGV 10.

There are several limitations, which narrow the use of the uniaxial platform solely. a) The mass and shape of the carried object should not shift. The center of mass of the AGV can be at the geometric center of the frame 67 of an unloaded AGV. Values depend on the AGV implementation. The center of mass should be below the axis of rotation of the wheels. b) The location of the center of mass of the AGV that is carrying an object should be above center of mass of an unloaded AGV. This should assure the pendulum self-righting and further equilibrium. c) In an embodiment the maximum mass of the carried object is limited by implementation of the AGV. The stability of the AGV might be compensated by active stabilization systems and applied motor control algorithms. The center of the mass of the carried object may not necessarily be below the axis of rotation of the wheels (axis Z and X), in this embodiment the AGV will balance the cargo, moving wheels with different accelerations, when moving and rotating forward and backward or when staying on the spot. This will guarantee the condition of the mass above the center of the mass of the unloaded AGV. In this embodiment the maximum mass of the carried object is limited to 500 kg. Table 1 includes a listing of physical characteristics and values for an embodiment of the AGV.

TABLE 1

| Characteristic | Value |
| --- | --- |
| Width × Depth × Height (mm) | 795 × 270 × 260 |
| Device weight | 45 kg* |
|  | *Depending on assembly |
| Diameter of the wheels (mm) | 250 |
| Type of the drive | Electric, independent for both wheels |
| Rated total drive power (W): | 1200 |
| Rated total torque of drives (Nm) | 90 Nm |
| Allowable payload per unit (kg) | 500 |

The AGV robot implementation can be a dual-wheeled AGV fabricated with a variety of materials, sizes, and internal components composition and placement. Additionally, mounted equipment as robot grippers, handlers, cameras, sensors, trays are also considered to be a part of a particular implementation. There are variety of use-cases, when the AGV robot might be effectively applied. It can perform the functions of: delivering components and parts and tools for robots, inspecting and controlling a factory, being a mobile surveillance system, if equipped with the camera, acting as a WiFi repeater, and/or acting as a mobile battery power charging point. The AGV could be used in dangerous spaces that are chemically or radioactively poisoned. If implemented in a small form factor, it may inspect/fix destinations unreachable for humans such as ventilation or sewerage systems. The AGV might be used for cabling as a cable puller in a channel.

Figure 5:
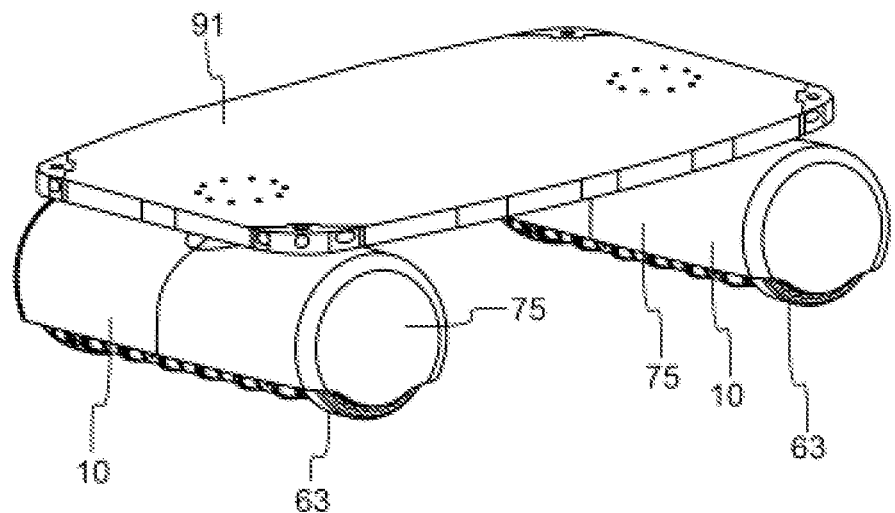
FIG. 5 illustrates a top perspective view of an embodiment of a two AGV robotic transportation apparatus having a platform.

The AGV 10 which have been described above can be used in combination with other one or more additional AGVs 10. With reference to FIG. 5, an embodiment of a robotic transportation apparatus is illustrated that has a first AGV 10 is coupled to a second AGV 10 with a transportation platform 91 which can be a rigid planar rectangular surface or any other geometric shape. The flanges 73 can be secured to the lower surface of the platform 91. In an embodiment, a cylinder can extend downward from the flange 73 which can fit within a corresponding hole in a coupling at the top of the AGV 10. Thus, the platform 91 can be easily removed from the AGVs 10.

Figure 6:
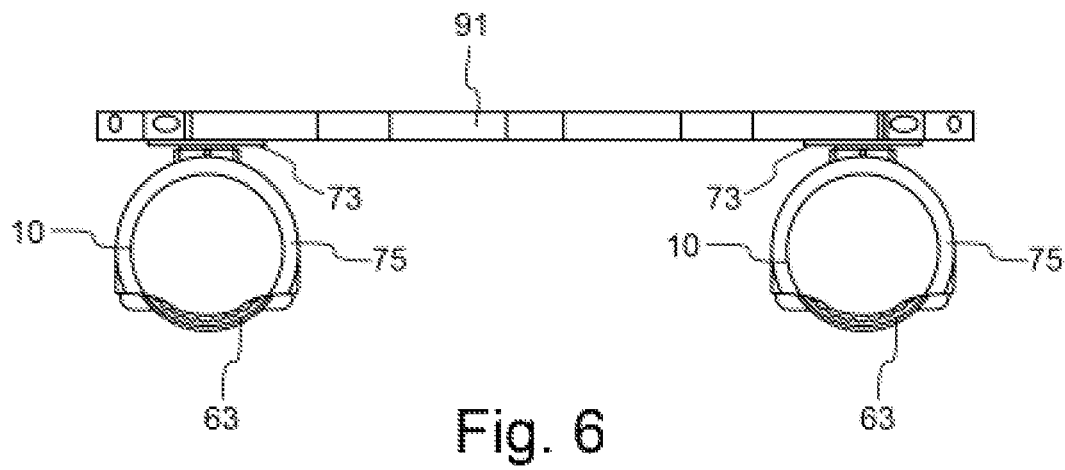
FIG. 6 illustrates a side view of an embodiment of a two AGV robotic transportation apparatus having a platform.

The first AGV 10 and the second AGV 10 can be attached to opposite ends of the platform 91. Thus, the length of the platform 91 can control the length of the AGV platform assembly. The width of the platform 91 can be approximately the same width as the AGVs 10. Objects can be placed on platform 91 and transported by the AGVs 10. FIG. 6 illustrates a side view of the AGV platform assembly 93. The bottom of the platform 91 can be coupled to the connection flanges 73 which are releasably coupled to the AGVs 10.

As discussed, the connection flanges 73 can rotate relative to the AGVs 10. Thus, the AGVs 10 can rotate relative to the platform 91 to guide the assembled apparatus in the desired direction. The AGVs 10 can be controlled and can rotate independently or in a coordinated manner. For example, drive power for rotating the wheels can be applied to one or both of the AGVs 10 allowing two wheel or four-wheel driving forces to the AGV platform assembly 93. In other embodiments, any number of AGVs 10 can be coupled to a platform 91 and combined to perform the transportation. The shape of the platform can be specifically designed for the product being transported. For example, for a long object like a pipe, several AGVs under the single narrow and long platform and wider platforms can be coupled to AGVs which are distributed across the width of the platform.

Figure 7:
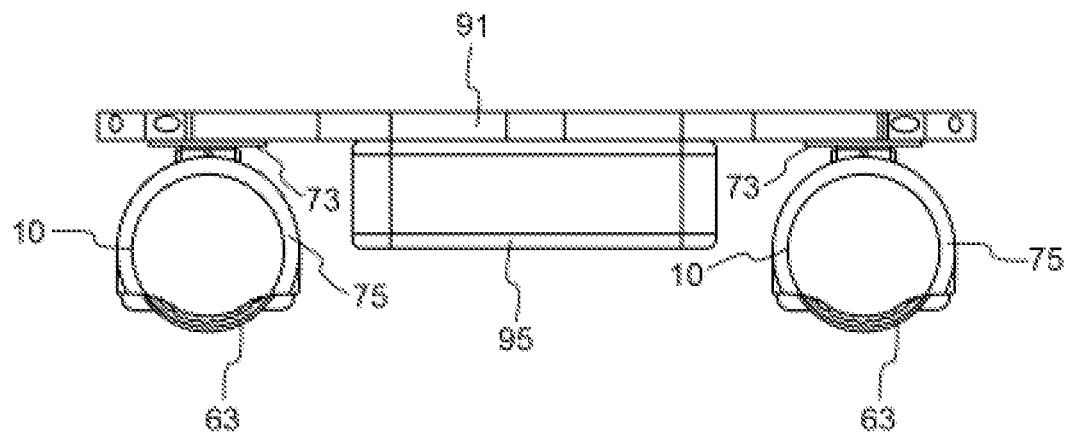
FIG. 7 illustrates a side view of an embodiment of a two AGV robotic transportation apparatus having a platform and a container under the platform.

FIG. 7 illustrates a side view of the assembled apparatus with a payload 95 mounted under the platform 91 of the AGV platform assembly 93. In an embodiment the payload 95 can be a protected container which can be used to transport additional objects. In an embodiment, the payload 95 can include rechargeable batteries which can be used to provide additional electrical power to the first and second AGVs 10, or be a source of the electrical power to external electrical consumers. For example, the payload 95 may provide electrical power to the object being transported such as a refrigeration unit or another structure that requires electrical power. In an embodiment, a lower surface of the payload 95 can provide an electrical coupling which allows the rechargeable batteries to be recharged by an electrical power source.

Figure 8:
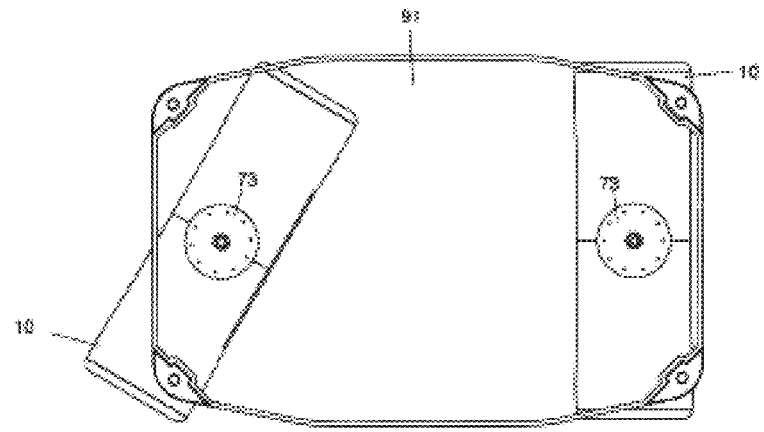
FIG. 8 illustrates a top view of an embodiment of a two AGV robotic transportation apparatus coupled to a platform with the front AGV turned and the rear AGV straight.
Figure 9:
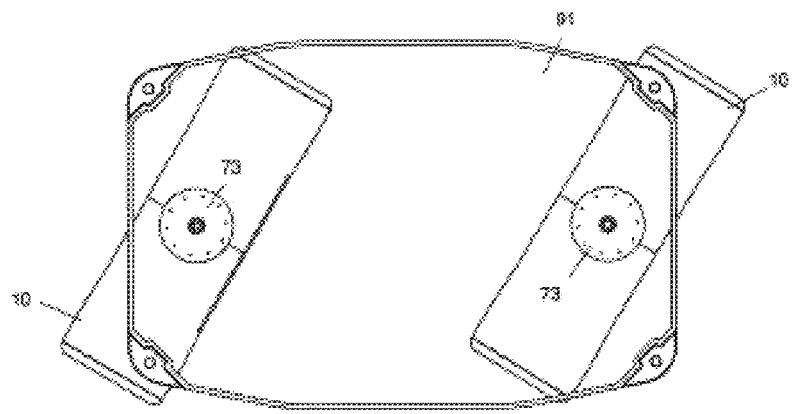
FIG. 9 illustrates a top view of an embodiment of a two AGV robotic transportation apparatus having a platform with the front AGV and the rear AGV turned in parallel.
Figure 10:
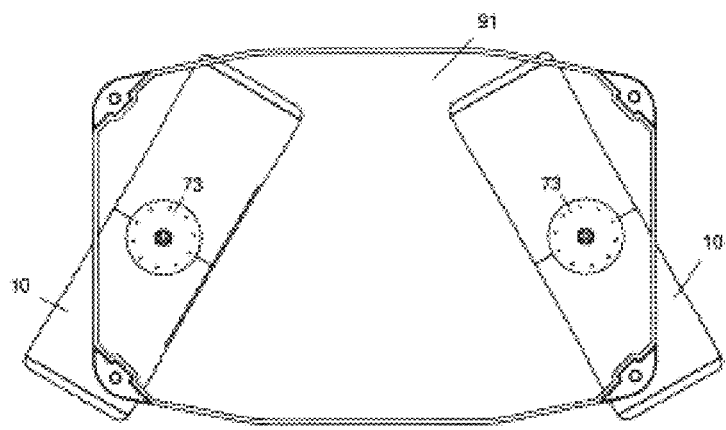
FIG. 10 illustrates a top view of an embodiment of a two AGV robotic transportation apparatus having a platform with the front AGV turned in one direction and the rear AGV turned in the opposite direction.

FIGS. 8-10 illustrate a top view of an embodiment of the robotic transportation apparatus. The AGV platform assembly 93 can normally move toward the left when traveling in a forward direction. With reference to FIG. 8, the left leading AGV 10 is rotated to the right and the right trailing AGV 10 is not rotated relative to the platform 91. When the so that the AGV platform assembly 93 will turn to the right like a car. The rotation of the leading AGV 10 can occur when the left wheel of the AGV 10 is rotated more than the right wheel. Alternatively, it is possible to rotate the leading AGV 10 to the right by rotating the right wheel in reverse. This provides omnidirectional movement ability for the platform.

With reference to FIG. 9, both of the AGVs 10 in the platform assembly 93 have been rotated to the right in parallel relative to the platform 91. In this configuration when the platform assembly 93 moves forward, the platform 91 moves forward in translation with no rotation. This can be very beneficial when the platform assembly 93 needs to move a product without rotating the product. This can be necessary when the product is very long or the product needs to be moved in a specific rotational orientation to a destination location.

With reference to FIG. 10, the AGVs 10 are rotated in opposite directions relative to the platform 91 with the forward AGV 10 rotated to the right and the trailing AGV 10 rotated to the left relative to the platform 91. When the platform assembly 93 moves forward, the platform 91 will rotate with a sharper radius of rotation than the radius from just the forward AGV 10 rotated as shown in FIG. 8.

Figure 11:
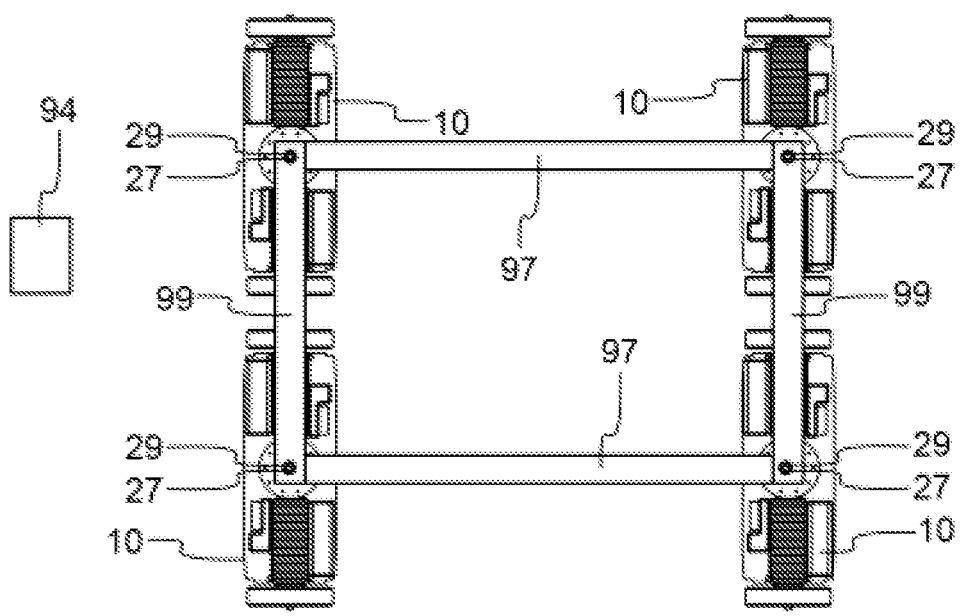
FIG. 11 illustrates a top view of an embodiment of a four AGV robotic transportation apparatus having four linkages between the AGVs.

In other embodiments, the robotic transportation apparatus can include four AGVs and 4 linkages. FIGS. 11-15 illustrate an embodiment of a robotic transportation apparatus having four AGVs and four linkages which form a parallelogram. With reference to FIG. 11, a top view on an embodiment of a robotic transportation apparatus is illustrated. In this embodiment, four AGVs 10 are coupled to four linkages 97, 99 which are straight elongated structures. The four linkages can include two length linkages 97 and two width linkages 99. The four linkages 97, 99 can have vertical holes 27 at the end portions of the linkages 97, 99. Cylindrical rods 29 can be placed through the holes 27 and into hole couplings in the top of the AGVs 10. In an embodiment the holes 27 can be configured with bushings or bearings which allow the cylindrical rods 29 to freely rotate within the holes 27 with low friction or rotational resistance. The cylindrical rods 29 can be placed in holes in the top of the AGVs 10 and the cylindrical rods 29 can be releasably attached to the AGVs 10.

In the illustrated configuration, the two length linkages 97 and two width linkages 99 are in a rectangular configuration. The angles between the length linkages 97 and width linkages 99 can be 90 degrees. As the robotic transportation apparatus moves, the AGV controller 94 can be a control mechanism which has a processor and a radio frequency (RF) transmitter or transceiver which can communicate with the AGVs 10 and control the positions of the coupled AGVs 10 to maintain the rectangular or parallelogram shape of the four linkages 97, 99 throughout the movement routes of the coupled AGVs 10. In other embodiments, the motor controllers (shown as reference number 55 in FIGS. 1-3) can communicate with each other and maintain the rectangular or parallelogram shape of the four linkages 97, 99 throughout the movement routes of the coupled AGVs 10.

There can be positional variations as the AGVs 10 move such that the angles between the four linkages 97, 99 might vary between 0 and 180 degrees. Although, the linkages 97, 99 are illustrated in parallelogram shapes, in other embodiments, any number of AGVs 10 can be coupled to any number of linkages which can be combined into any shaped assembly to provide specific transportation functions. The shape of the linkage assemblies can be specifically designed for the product being transported. For example, for a long object like a pipe, several AGVs under the single narrow and long linkage assembly. Alternatively, the linkages can be configured to provide wider linkage assemblies with multiple AGVs distributed across the width of the linkage assemblies.

Figure 12:
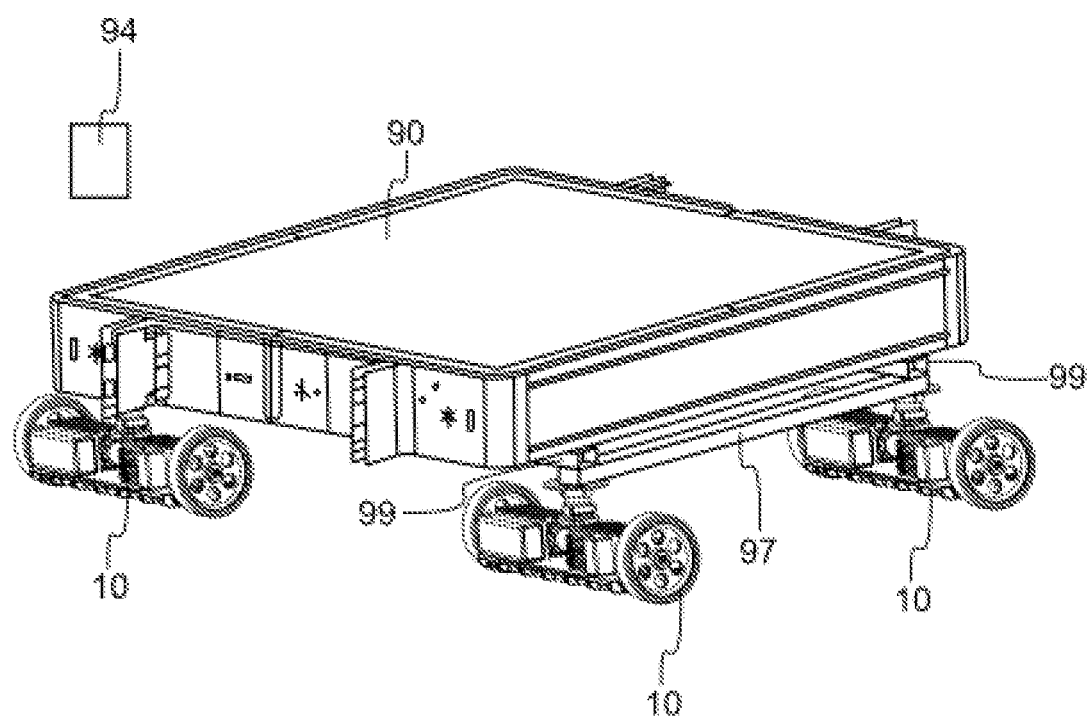
FIG. 12 illustrates a top perspective view of an embodiment of a four AGV robotic transportation apparatus having a container placed on the linkages between the AGVs.

With reference to FIG. 12, the four linkages 97, 99 in the rectangular configuration can provide a support platform for a container structure 90 having a rectangular planar flat base which can be placed on the four linkages 97, 99. In the illustrated embodiment, the width linkages 99 can be higher than the length linkages 97. Thus, the base of the container structure 90 can rest on the two width linkages 99. Support for the weight of the container structure 90 is distributed between the four AGVs 10. The container structure's 90 platform base can have platform alignment features on a lower surface which can be used for alignment purposes. More specifically, the platform alignment features can be placed against AGV alignment features on an upper surface of the left length linkage, the right length linkage, the front width linkage, or the rear width linkage. The engagement of the platform alignment features and the AGV alignment features can result the left length linkage 97, the right length linkage, the front width linkage 99, and the rear width linkage 99 being held to prevent movement between the linkages 97, 99 and container structure 90. Thus, the platform alignment features and the AGV alignment features hold the linkages 97, 99 in the required rectangular shape for securely supporting and transporting the container structure 90 by the robotic transportation apparatus.

In other embodiments, linkages can be used to combine any number of AGVs 10 to perform the transportation. The AGV controller 94 can control the shape of the linkages can be specifically designed for the product being transported. For example, for a long object like a pipe, several AGVs under the single narrow and long platform. In other embodiments, wider platforms can be coupled to AGVs.

In an embodiment, the robotic transportation apparatus can move to a payload loading location. A robot mechanism can place the container structure 90 on the robotic transportation apparatus which can transport the container structure 90 to a delivery location where another robot mechanism can remove the container structure 90 from the robotic transportation apparatus.

In an embodiment, a plurality of component payloads are delivered from a loading location to a delivery location by the robotic transportation apparatus. The robotic transportation apparatus must then return to the payload loading location. Because the pathway between the loading and unloading locations can be crowded with traveling robotic transportation apparatus, it can be desirable for the robotic transportation apparatus to occupy less space when not transporting goods.

Figure 13:
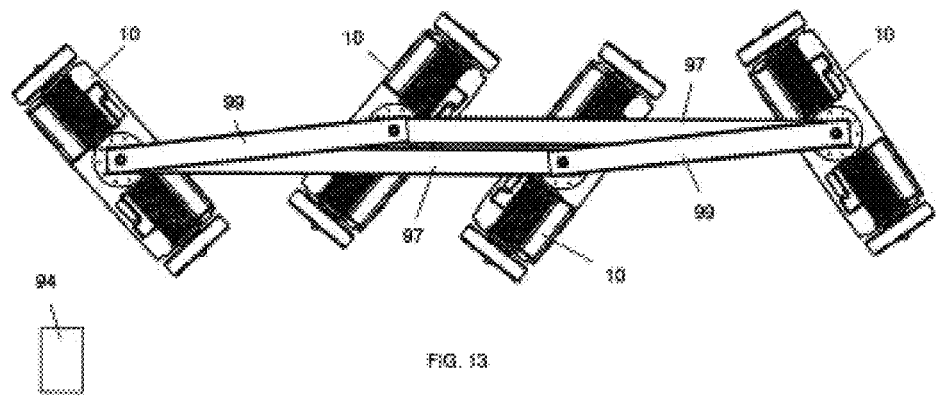
FIG. 13 illustrates an embodiment of a four AGV robotic transportation apparatus in a narrow configuration with AGV turned out of alignment.
Figure 14:
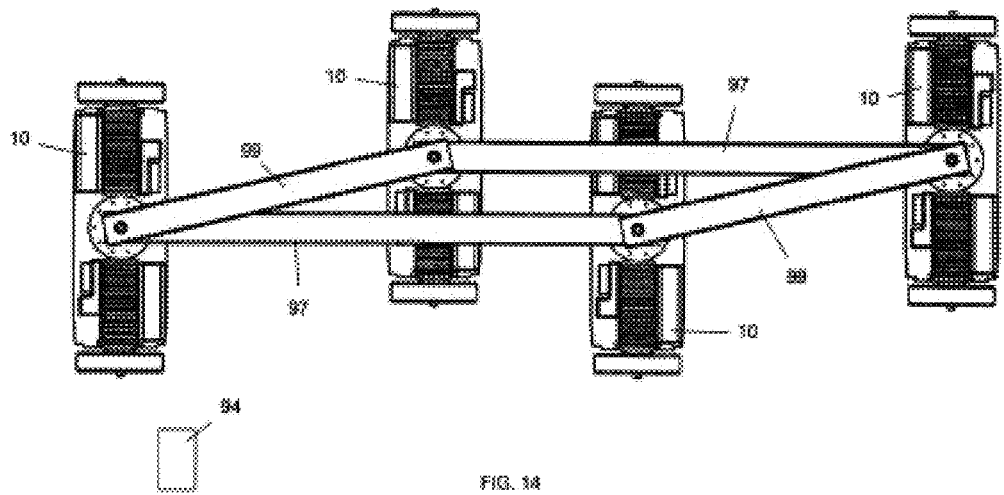
FIG. 14 illustrates an embodiment of a four AGV robotic transportation apparatus in a narrow configuration with AGV turned into alignment.

In an embodiment, the robotic transportation apparatus can be adjusted to have a narrower width. With reference to FIG. 13, the AGV controller 94 can cause the AGVs 10 to rotate away from a parallel alignment and move the AGVs 10 so that the four linkages 97, 99 form a narrower and longer parallelogram. With reference to FIG. 14, once the robotic transportation apparatus is in the desired configuration, the AGV controller 94 can cause the AGVs 10 to be aligned in a parallel orientation so that the robotic transportation apparatus can move in a straight line with a narrower width which takes less space. Once the robotic transportation apparatus arrives at the loading location, the AGV controller 94 can cause the AGVs 10 to move so that the four linkages 97, 99 again form a rectangle. The robot mechanism can place the container structure 90 on the expanded rectangular configuration and the delivery process can be repeated.

Figure 15:
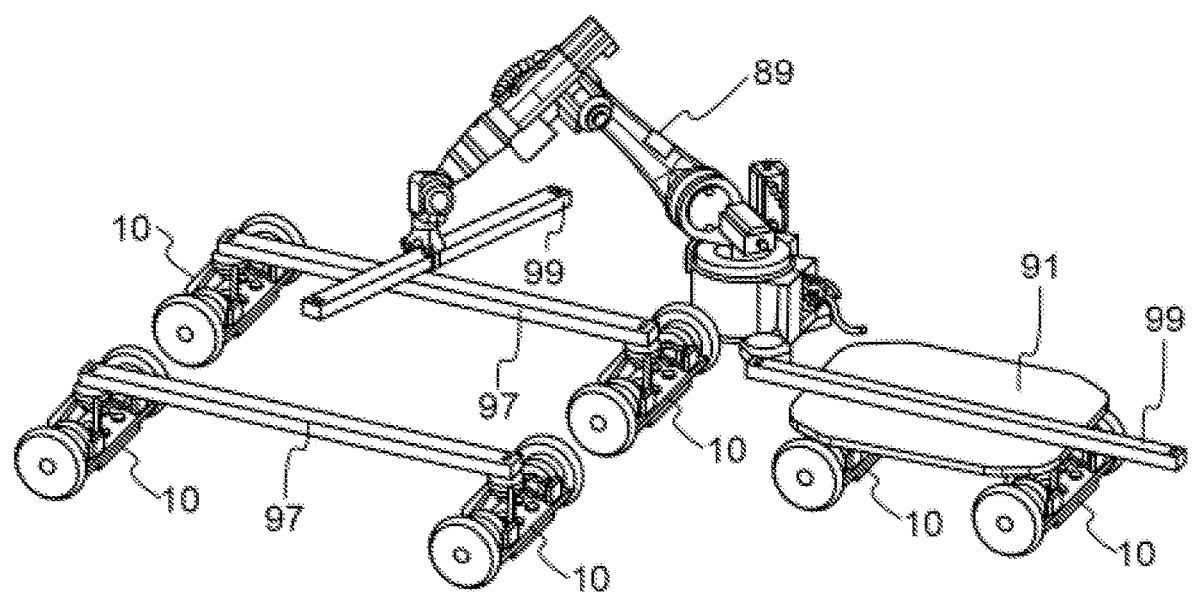
FIG. 15 illustrates a robot assembling a four AGV robotic transportation apparatus.

With reference to FIG. 15, in an embodiment, the AGVs 10 can be controlled to move to an assembly location where a robot 89 can assemble the robotic transportation apparatus. In the illustrated example, the AGVs 10 are positioned and length linkages 97 have been placed on the AGVs 10. The robot 89 is placing the front width linkage 99 on the front ends of the length linkages 97. The rear width linkage 99 is on a platform 91 which has been delivered to the robot 89 for installation on the robotic transportation apparatus.

Figure 16:
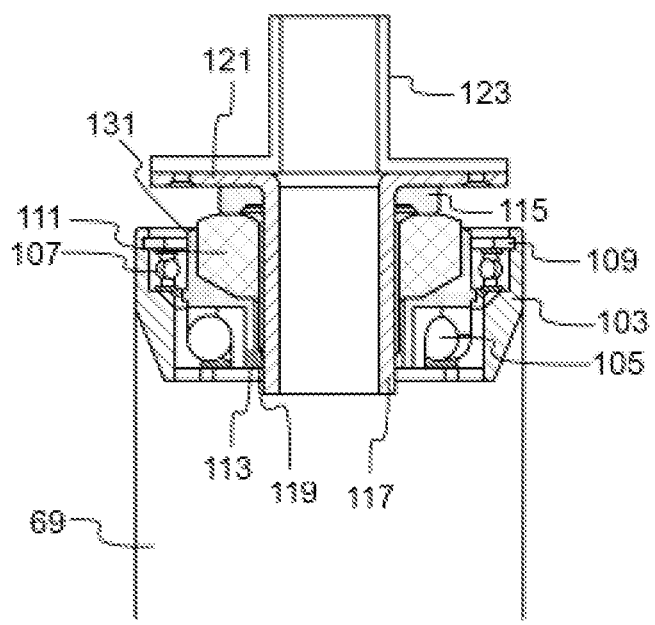
FIG. 16 illustrates a cross section view of an embodiment of a hitch connection mechanism.
Figure 17:
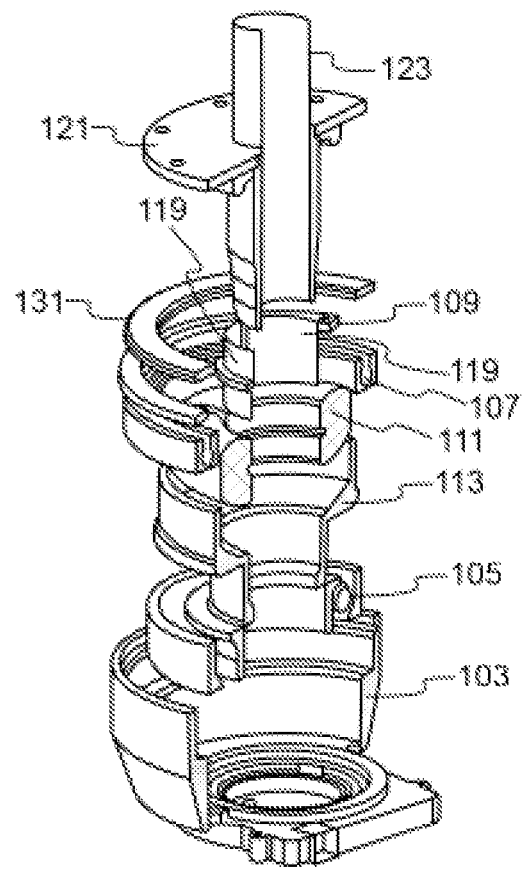
FIG. 17 illustrates an exploded view of an embodiment of a hitch connection mechanism.

As described above, the AGVs provide a flexible coupling mechanism for connection, retention, and disconnection of the described cylindrical posts and linkages. FIG. 16 illustrates a cross section view of an embodiment of the hitch in a connected configuration and FIG. 17 illustrates an exploded view of an embodiment of the hitch. An AGV can be coupled to a connector with the connector mounted on the payload holding column 69 can rotate freely relative to the AGV. The hitch can include a connector and a connector joint. In the illustrated embodiment, the connector includes a vertical post 123 and a connection shaft 117 which can both be cylindrical structures with a cylindrical outer surface. The vertical post 123 can extend upward from a flange 121 and the connection shaft 117 can extends downward from a flange 121 which can be a planar structure. The post 123 can also extend upward through the holes in the width and length linkages which can rest on the flange 121. A circular shim 115 can be placed around the connection shaft 117 under the flange 121. The shim 115 can have a convex surface which extends downward.

In the illustrated example, the connector joint includes a head tube 103 which is coupled to a payload holding column of the AGV. In the illustrated embodiment, the head tube 103 can be bonded to the holding column of the AGV. The inner surfaces of the head tube 103 can include an upper cylindrical surface and a concentric lower cylindrical surface and there is a horizontal planar step between the upper cylindrical surface and a lower cylindrical surface. Bearings are mounted in the head tube 103. In an embodiment, an upper radial bearing 107 is mounted within the upper cylindrical surface of the head tube 103 and a lower thrust bearing 105 is mounted within the upper cylindrical surface of the head tube 103. The outer diameters of the upper radial bearing 107 can be substantially the same diameter as the inner diameter of the upper cylindrical surface of the head tube 103 and the outer diameter of the lower thrust bearing 105 can be substantially the same diameter as the inner diameter of the lower cylindrical surface of the head tube 103.

A holder cup 113 is mounted within the upper radial bearing 107 and the lower thrust bearing 105. The holder cup 113 can have an upper cylindrical surface and a lower cylindrical surface. The outer diameter of the upper cylindrical surface of the holder cup 113 can be substantially the same as the inner diameter of the upper radial bearing 107 and the outer diameter of the lower cylindrical surface of the holder cup 113 can be substantially the same as the inner diameter of the lower thrust bearing 105. A lock ring 109 can be compressed and placed within the inner diameter of the head tube 103 above the upper radial bearing 107. The lock ring 109 can then be placed in a groove formed in the inner diameter of the head tube 103 to hold the upper radial bearing 107, the holder cup 113 and the lower thrust bearing 105 in the head tube 103. In an embodiment, a dust cover 131 can be placed above the upper radial bearing 107 to prevent contaminants from ambient particles. The dust cover 131 can be placed within the inner diameter of the head tube above the upper radial bearing 107 against an upper portion of the holder cup 113. In an embodiment, the holder cup 113 has a protrusion which extends radially outward from the upper outer cylindrical surface of the cup holder 113. The lower surface of the inner diameter of the upper radial bearing can be adjacent to the protrusion to prevent cup holder 113 from being pulled upward out of the head tube 103 after the lock ring 109 has been installed in the head tube 103.

Although the hitch has been illustrated and described with the upper radial bearing 107 and the lower thrust bearing 105 as ball bearings, in other embodiments, other rotational mechanisms can be used such as bushings, needle bearings, roller bearings, roller thrust bearings, or any other mechanism which can allow the holder cup 113 to rotate freely within the head tube 103 with low friction under axial and radial loads.

An annular elastomer holder 111 is held within the holder cup 113 which can closely fit against the outer and lower surfaces of the elastomer holder 111. The holder cup 113 and the head tube 103 can be made of an inelastic material such as metal, a strong plastic, a strong composite material such as carbon fiber, or other suitable inelastic materials. The annular elastomer holder 111 can have an upper surface that is higher than all other components of the connector joint. The elastomer holder 111 can have a cylindrical outer surface and a cylindrical inner surface. The outer diameter of the elastomer holder 111 can be substantially the same or slightly smaller than the upper inner diameter of the holder cup 113. A first shell 119 and a second shell 119 can be placed against the cylindrical inner surface of the annular elastomer holder 111. The concave inner surfaces of the first shell 119 and the second shell 119 can each be half cylindrical surfaces. In an embodiment, the first shell 119 and the second shell 119 can each have a planar flange extending outward from convex half cylindrical outer surfaces. The planar flanges can be placed between a planar surface of the holder cup 113 and a lower edge of the annular elastomer holder 111. The planar flanges can prevent the first shell 119 and the second shell 119 from falling out of the connector joint. The concave inner surfaces of the first shell 119 and the second shell 119 can provide a sliding surface against which the connection shaft 117 can slide when the hitch is being connected and disconnected.

Although the inventive hitch connection system includes two half cylinder shells 119, in other embodiments, the two shells 119 can be replaced with a single piece cylinder shell which has a single slot across the length of the cylinder. As discussed, the inner diameter of the cylindrical surface of the elastomer holder 111 can contract when the upper surface is compressed by the circular shim 115. In this embodiment, the single piece cylinder shell can contract so the inner diameter decreases so that it is pressed against the connection shaft 117.

Figure 18:
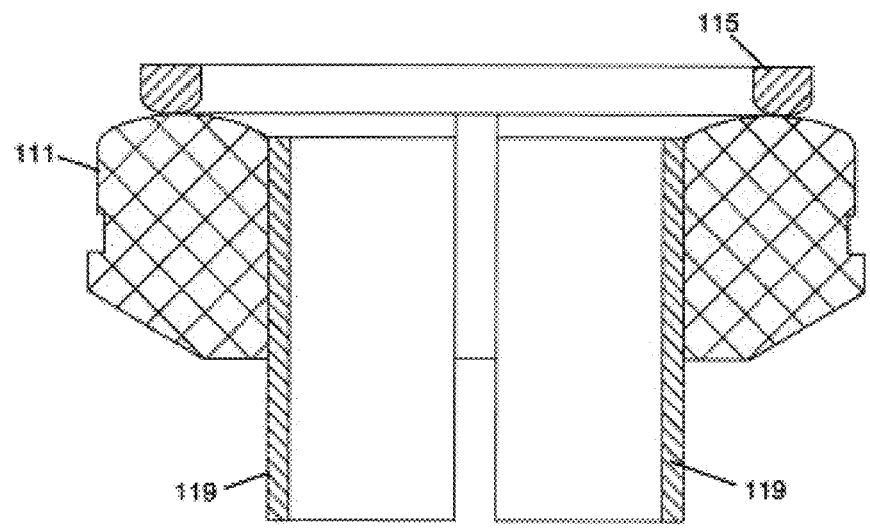
FIGS. 18 and 19 illustrate cross section views of annular elastomer holders, shells and circular shims.
Figure 19:
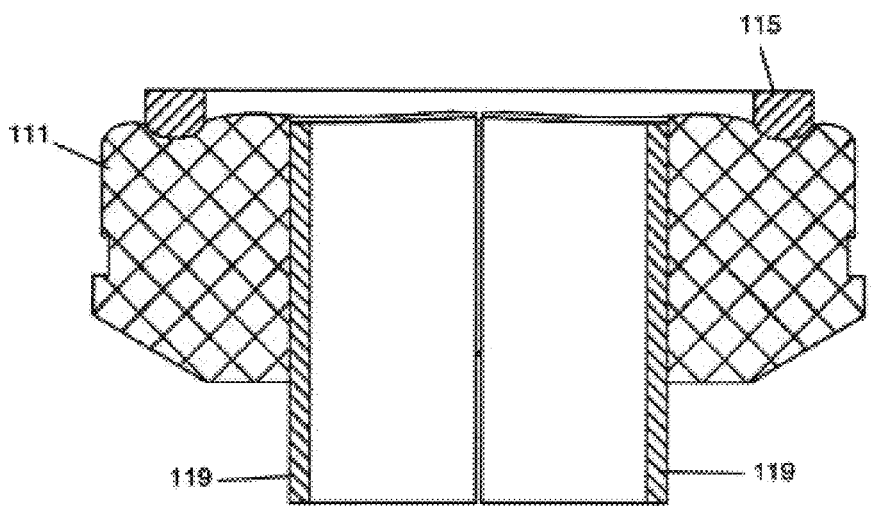

With reference to FIGS. 18 and 19, a more detailed cross section of an embodiment of the elastomer holder 111, the circular shim 115, the first shell 119 and the second shell 119 are illustrated. The upper surface of the elastomer holder 111 and the lower surface of the circular shim 115 can both be convex surfaces. When the upper surface of the elastomer holder 111 is compressed downward by the lower convex surface of the circular shim 115, the elastomer holder 111 can expand inward against the first shell 119 and the second shell 119. FIG. 18 illustrates the elastomer holder 111 in an uncompressed state where the circular shim 115 is in contact with the elastomer holder 111 but not deforming the upper surface. The elastomer holder 111 is not compressed and does not excerpt an inward force against the first shell 119 and the second shell 119. Thus, there is a gap between the first shell 119 and the second shell 119.

With reference to FIG. 19, a downward force is applied to the circular shim 115 which is pressed against the upper surface of the elastomer holder 111. The elastic material of the elastomer holder 111 is compressed and the inner diameter of the elastomer holder 111 contracts inward resulting in the first shell 119 and the second shell 119 moving towards each other. The circular shim 115 is pressed against the upper surface of the elastomer holder 111 when the connection shaft (not shown) is fully inserted into the elastomer holder 111 between the first shell 119 and the second shell 119. Thus, the first shell 119 and the second shell 119 would be compressed against the connection shaft. In the illustration, the first shell 119 and the second shell 119 are moved very close to each other due to the inward force of the compressed elastomer holder 111 since the connection shaft is not between the first shell 119 and the second shell 119.

When a downward force is applied to the circular shim 115 compressing the top of the elastomer holder 111, the shells 119 are compressed inward against the connection shaft. This compression tends to secure the shells 119, the elastomer holder 111, the holder cup 113 and the inner race of the upper radial bearing 107 and the inner race of the lower thrust bearing 105 to the connection shaft 117. The upper radial bearing 107 and the lower thrust bearing 105 allow the connection shaft 117 the shells 119, the elastomer holder 111, and the holder cup 113 to all rotate about a vertical axis aligned with the center of the connection joint. The upper radial bearing 107 and the lower thrust bearing 105 transfer horizontal forces which are generated by the AGV to a structure coupled to the connection shaft 117. In general, there will be a downward force applied to the connection shaft 117 and the lower thrust bearing 105 which can transmit the vertical forces from the connection shaft 117 to the AGV.

In different embodiments, the elastomer holder 111 can be made of various elastic materials. In an embodiment, elastomer holder 111 can be made of strong elastic material such as polyurethane. However, in other embodiments, other suitable materials can include rubber materials such as: natural rubber, polyisoprene, polybutadiene, butyl rubber, styrene, nitrile rubber, ethylene, propylene, polyacrylic, silicon, fluoroelastomers, ethylene vinyl, etc. The elastomer holder 111 material can have a hardness that can provide industrial strength and hardness to prevent damage when exposed to hard forceful contact with the connection shaft 117.

In the illustrated embodiments, the outer and lower surfaces of the elastomer holder 111 are in direct contact with the inner upper surfaces of the holder cup 113 and the inner cylindrical surface of the elastomer holder 111 is in direct contact with the outer cylindrical surfaces of the shells 119. The upper convex surface of the elastomer holder 111 can be exposed and the highest portion of the connector joint. The apex of the upper convex surface of the elastomer holder 111 can define a circle having a diameter that can be midway between the inner and outer cylindrical diameters of the elastomer holder 111. The circular shim 115 can have a convex surface which can extend downward. The lower surface of the circular shim 115 can have substantially the same diameter as the apex of the elastomer holder 111. When the circular shim 115 is pressed into the upper surface of the elastomer holder 111, the elastic material can conform to the convex surface of the circular shim 115. Because the upper, lower and outer surface of the elastomer holder 111 are against solid surfaces, the elastomer holder 111 can only move inward as illustrated in FIG. 10.

The AGVs can be a universal platform, a constructor, standard, easily coupled, mechanical, electronic and software components for building scalable logistics solutions and mobile transport robots of any complexity. The invention is the automated guided vehicle, which is movable in all directions. The route of the AGV platforms is not necessarily pre-defined, it might be dynamically changed in real-time. The invention scales horizontally and vertically. The invention eliminates the need to design/purchase dedicated mechanisms (AGVs) for transporting the loads. Number of known shapes and functions of AGVs might be implemented using proposed approach. The invention allows to decrease or optimize the logistics in the assembly factory.

AGVs can be used individually or in combination with other AGVs can be used in a variety of areas to support processing and handling throughout a facility or outside the facility. In an assembly embodiment, the AGV can be used for moving products through production processes. In a kitting embodiment, the AGV can collect parts which can be delivered to a machine or worker for assembly. In an embodiment, the AGV can be used for part transportation. Robots can place parts onto pallets which can be moved with the AGV. The AGV can also be used to move loose parts. The AGV can be used for staging by delivering pallets of parts for production processes. The AGVs can be used in warehouse applications where they can be used for moving products. For example, finished goods can be wrapped in protective stretch wrappers and the AGV can move the wrapped goods from stretch wrappers to docks or storage. The AGVs can be used for order picking where the AGV moves ordered products to trailer-loading area for distribution and transporting a platform for a picker to place selected items upon. The AGVs can be used for assembly with where parts are delivered to assembly just-in-time (JIT) delivery. The AGV can be used for towing trailers of parts/materials to consumption points where they can be used for assembly. The AGVs can also be used for transfer to shuttle or transfer loads across high traffic aisles. In an embodiment, the AGVs can be used for surveillance by equipping the AGV with cameras and sensors which can communicate with a computing device through a radio frequency transmitter. The AGV platform might be effectively applied at various industries including: Automotive, Beverage, Chemicals, Commercial printing, Food, Hospital, Manufacturing, Newspaper, Paper, Pharmaceutical, Plastics, Warehousing and distribution etc. The AGV can also be used for operation in dangerous for human spaces.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the flowing claims reflect, inventive aspects lie in less than all features of any single foregoing disclosed embodiment.

The disclosure comprises the following clauses:

1. A robotic transportation apparatus comprising a plurality of automatic guided vehicles (AGV) wherein each of the AGVs has a left wheel driven by a left motor, a right wheel driven by a right motor, a motor controller that controls the left motor and the right motor, and a rotational coupling having a vertical rotational axis coupled to a frame; a left length linkage between a front left AGV and a rear left AGV; a right length linkage between a front right AGV and a rear right AGV; a front width linkage between the front left AGV and the front right AGV; a rear width linkage between the rear left AGV and the rear right AGV; wherein the rotational coupling allow the left length linkage, the right length linkage, the front width linkage, and the rear width linkage to rotate relative to the AGVs.

2. The robotic transportation apparatus of clause 1 wherein an angle between the left length linkage and the front width linkage is between 0 degrees and 180 degrees.

3. The robotic transportation apparatus of any preceding clause, further comprising one or more additional AGVs coupled to the rear left AGV or the rear right AGV with additional couplings.

4. The robotic transportation apparatus of any preceding clause, wherein the left length linkage and the right length linkage are greater in length than the front width linkage and the rear width linkage.

5. The robotic transportation apparatus of any preceding clause, wherein the motor controllers of the plurality of AGVs maintain an angle between the left length linkage and the front width linkage between 0 degrees and 180 degrees and maintain an angle between the right length linkage and the front width linkage between 0 degrees and 180 degrees while the plurality of AGVs are moving.

6. The robotic transportation apparatus of any of clauses 1 to 5, further comprising an AGV controller for controlling the plurality of AGVs while moving to maintain an angle between the left length linkage and the front width linkage between 0 degrees and 180 degrees and maintain an angle between the right length linkage and the front width linkage between 0 degrees and 180 degrees.

7. The robotic transportation apparatus of any of clauses 1 to 5, further comprising an AGV controller for controlling the plurality of AGVs so the left length linkage, the right length linkage, the front width linkage, and the rear width linkage maintain a parallelogram shape while the robotic transportation apparatus is moving.

8. The robotic transportation apparatus of any of clauses 1 to 5, further comprising an AGV controller for controlling the plurality of AGVs so a shape of the left length linkage, the right length linkage, the front width linkage, and the rear width linkage transitions from a rectangular shape to a non-rectangular parallelogram shape by turning the AGVs coupled to the front width linkage in opposite directions and turning the AGVs coupled to the rear width linkage in opposite directions while the robotic transportation apparatus is moving.

9. The robotic transportation apparatus of any of clauses 1 to 5, further comprising an AGV controller for controlling the plurality of AGVs so a shape of the left length linkage, the right length linkage, the front width linkage, and the rear width linkage transitions from a non-rectangular parallelogram shape to a rectangular shape by turning the AGVs coupled to the front width linkage in opposite directions and turning the AGVs coupled to the rear width linkage in opposite directions while the robotic transportation apparatus is moving.

10. The robotic transportation apparatus of any of clauses 1 to 5, further comprising an AGV controller for controlling the AGVs directly coupled to the front width linkage to turn in the same direction and the AGVs directly coupled to rear width linkage to not turn.

11. The robotic transportation apparatus of any of clauses 1 to 5, further comprising an AGV controller for controlling the AGVs directly coupled to the front width linkage to turn in the same direction and the AGVs directly coupled to rear width linkage to turn in an opposite direction.

13. The robotic transportation apparatus of any preceding clause, further comprising a box container having a rectangular base placed over the left length linkage, the right length linkage, the front width linkage, and the rear width linkage which are configured in a rectangular shape while the robotic transportation apparatus is moving.

14. The robotic transportation apparatus of any preceding clause, further comprising a rectangular platform placed over the left length linkage, the right length linkage, the front width linkage, and the rear width linkage which are configured in a rectangular shape while the robotic transportation apparatus is moving.

15. The robotic transportation apparatus of any preceding clause, further comprising a platform having platform alignment features on a lower surface of the platform wherein the platform alignment features are placed against AGV alignment features on an upper surface of the left length linkage, the right length linkage, the front width linkage, or the rear width linkage.

The invention claimed is:

1. A robotic transportation apparatus comprising:
    a plurality of automatic guided vehicles (AGV) wherein each of the AGVs has a left wheel driven by a left motor, a right wheel driven by a right motor, a motor controller configured to control the left motor and the right motor, and a rotational coupling having a vertical rotational axis coupled to a frame; and
    a plurality of linkages, each of the plurality of linkages coupling together two of the plurality of AGVs;
    wherein the rotational coupling allows each of the plurality of linkages to rotate relative to the AGVs; and
    an AGV controller configured to control the plurality of AGVs so a shape of the plurality of linkages transitions from a rectangular shape to a non-rectangular parallelogram shape or from a non-rectangular parallelogram shape to a rectangular shape while the robotic transportation apparatus is moving.

2. The robotic transportation apparatus of claim 1, further comprising:
    one or more additional AGVs each coupled to one of the plurality of AGVs.

3. The robotic transportation apparatus of claim 1, wherein linkages of a first set of the plurality of linkages are greater in length than linkages of a second set of a plurality of linkages.

4. The robotic transportation apparatus of claim 1, wherein:
    the AGV controller is configured to control the plurality of AGVs so the plurality of linkages maintain a parallelogram shape while the robotic transportation apparatus is moving.

5. The robotic transportation apparatus of claim 1, further comprising:
    the AGV controller is configured to control the AGVs directly coupled to a first linkage to turn in the same direction and the AGVs directly coupled to a second linkage to not turn.

6. The robotic transportation apparatus of claim 1, wherein:
    the AGV controller is configured to control AGVs directly coupled to a first linkage to turn in the same direction and the AGVs directly coupled to a second linkage to turn in an opposite direction.

7. The robotic transportation apparatus of claim 1, further comprising:
    a box container having a rectangular base placed over the plurality of linkages when the plurality of linkages are configured in a rectangular shape while the robotic transportation apparatus is moving.

8. The robotic transportation apparatus of claim 1, further comprising:
    a rectangular platform placed over the plurality of linkages when the plurality of linkages are configured in a rectangular shape while the robotic transportation apparatus is moving.

9. The robotic transportation apparatus of claim 1, further comprising:
    a platform having platform alignment features on a lower surface of the platform wherein the platform alignment features are placed against AGV alignment features on an upper surface of one of the plurality of linkages.

* * * * *